Patented Mar. 24, 1936

2,035,314

UNITED STATES PATENT OFFICE 2,035,314

SYNTHETIC RESIN

Virgil L. Hansley and Norman D. Scott, Niagara Falls, N. Y., assignors to E. I. du Pont de Nemours & Company, Wilmington, Del., a corporation of Delaware No Drawing. Application April 2, 1934,
Serial No. 718,744

5 Claims. (Cl. 260—8)

This invention relates to resinous materials and more particularly to new resins of the polyhydric alcohol-polycarboxylic acid type.

This invention has as an object the preparation of new and useful synthetic resins. A further object is the production of polyhydric alcohol-polycarboxylic acid resins which are, without the aid of special modifying agents, soluble in a wider range of solvents than the usual resins of this type. Another object is an improved process for making polyhydric alcohol-polycarboxylic acid resins. Other objects will appear hereinafter.

These objects are accomplished by the heat treatment of a mixture of polycarboxylic acid and an alkyl disubstituted ethylene glycol of the general formula R.CHOH.CHOH.R, where R is a straight aliphatic carbon chain of at least nine carbon atoms.

These glycols are made by hydrogenating the corresponding fatty acid acyloins. Thus the acyloin of lauric acid

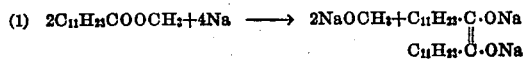

upon hydrogenation yields

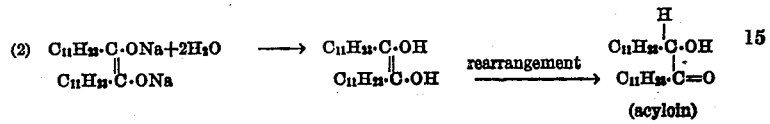

Symmetrical diundecyl ethylene glycol

The higher fatty acid acyloin is preferably made and hydrogenated according to the methods disclosed in copending application 701,052 filed December 5, 1933 by V. L. Hansley. The acyloin is made by reacting an ester of a higher fatty acid having at least one more carbon atom than that required for the value of R given above, with an alkali metal and hydrolyzing the resulting alkali metal compound. The following indicates (1) the reaction of sodium with the methyl ester of lauric acid ($C_{12}H_{24}O_2$), (2) the hydrolysis of this intermediate to the acyloin, (3) the hydrogeneration of the acyloin to a glycol fitting the above general formula, R being an alkyl radical of 11 carbon atoms.

(1) $2C_{11}H_{23}COOCH_3 + 4Na \longrightarrow 2NaOCH_3 + \begin{matrix} C_{11}H_{23} \cdot C \cdot ONa \\ \parallel \\ C_{11}H_{23} \cdot C \cdot ONa \end{matrix}$

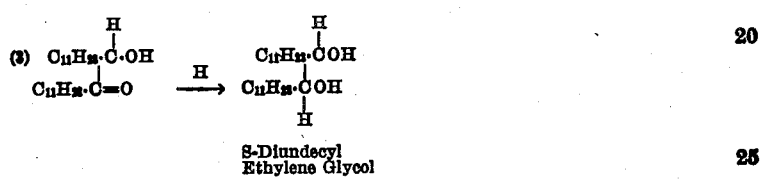

(acyloin)

s-Diundecyl
Ethylene Glycol

The hydrogenation of the acyloin may be effected in one of the several methods disclosed in the mentioned application, the preferred method being to react the acyloin with hydrogen under pressure in the presence of a hydrogenating catalyst. The following is a specific illustration of this method:

An 8.4 gram quantity of the acyloin from larric acid was catalytically reduced by means of a $PtO_2$ catalyst (Organic Syntheses Collective vol. I, 1932, p. 452) in cyclohexane solution at 20–25° C. and with hydrogen at a pressure of substantially one atmosphere. The absorption of hydrogen was complete in seven hours, during which time, the theoretical amount of hydrogen had been absorbed. By fractional crystallization 5.6 grams (66.5% yield) of the racemic or high melting form of sym.-diundecyl ethylene glycol, M. P. 123–124° C. was obtained. From the mother liquor 2.5 grams (29.8% yield) of the low melting modification, M. P. 60–80° C. was obtained. This low melting form was apparently an equimolecular mixture of the meso and racemic forms.

A satisfactory way of preparing the resins of this invention is by simultaneous fusion of the ingredients in an open vessel provided with suitable stirring devices. We prefer to use a "balanced" formula, i. e., chemically equivalent proportions of the ingredients.

The following examples are illustrative of the method used in carrying out our invention:

Example I

| | |
|---|---|
| Phthalic anhydride | 28.68 |
| S-Diundecyl ethylene glycol (hydrogenated acyloin of lauric acid) | 71.32 |
| Total | 100.00 |

The ingredients were mixed in the cold, heated in one hour to 200° C., and held at that temperature for ten hours. The mixture was agitated throughout the run by means of a mechanical stirrer. The product obtained was a dark-colored, balsamic product of acid number 21. It was soluble in aliphatic hydrocarbon and ester solvents.

Example II

| | |
|---|---|
| Adipic acid | 28.4 |
| S-Diundecyl ethylene glycol (hydrogenated acyloin of lauric acid) | 71.6 |
| Total | 100.0 |

The above resin was made in exactly the same manner as the resin of Example I. Similarly to the resin of Example I, the resin of this example was a dark-colored, balsamic product, soluble in aliphatic hydrocarbon and ester solvents. Its acid number was 38.

Example III

| | |
|---|---|
| Glycerol | 19.83 |
| Phthalic anhydride | 42.17 |
| S-Diundecyl ethylene glycol (hydrogenated acyloin of lauric acid) | 6.85 |
| Linseed oil acids | 31.15 |
| Total | 100.00 |

The ingredients were mixed in the cold, heated in one hour to 200° C., and held at that temperature for four and three-quarters hours. The resulting product was a viscous liquid, soluble in aliphatic hydrocarbon and ester solvents, and had an acid number of 44.5.

In place of the hydrogenated acyloin of lauric acid we may use the hydrogenated acyloins of methyl stearate, palmitate, myristate, caprate and the like. The solid hydrogenation products of the acyloins are the alkyl derivatives of ethylene glycol:

| Acyloin of fatty acid | Hydrogenated acyloin or glycol |
|---|---|
| Capric | Sym. dinonyl ethylene glycol ($C_{20}H_{40}(OH)_2$) |
| Undecylic | Sym. didecyl ethylene glycol ($C_{22}H_{44}(OH)_2$) |
| Myristic | Sym. ditridecyl ethylene glycol ($C_{28}H_{56}(OH)_2$) |
| Stearic | Sym. diheptadecyl ethylene glycol ($C_{36}H_{72}(OH)_2$) |

Additional suitable disubstituted ethylene glycols that may be mentioned are S-diphentadecyl ethylene glycol, S-dinonadecyl ethylene glycol, S-dinonacosyl ethylene glycol, etc.

The resins of this invention can be combined with drying oils and cellulose derivatives, and thus find useful application in the manufacture of coating compositions. The resins synthesized and disclosed herein can be blended by heating, by mutual solvents, or by other means with one or more of the following substances: drying, semi-drying, and non-drying oils, e. g. linseed, soya bean, coconut, castor oils; cellulose derivatives, e. g. nitrocellulose, benzyl cellulose, ethyl cellulose, etc.; natural resins and ester gums and their hydrogenation products, e. g. rosin, congo, copal, rosin glyceride, hydrogenated ester gum, etc.; other synthetic resins and resin-forming materials, e. g. metastyrene, coumarone-indene resins, amine-aldehyde resins, acrylic ester polymers, vinyl resins, casein, polyhydric alcohol-polycarboxylic acid resins, etc.; bitumens, e. g. natural and processed asphalts; natural and synthetic waxes; and other ester-like bodies, e. g. stearin, castor oil, hydrogenated castor oil, tricresyl phosphate, dibutyl phthalate, etc. To our products, alone or combined with one or more of the above enumerated substances, we may add pigments, solvents, plasticizers, anti-oxidants, fillers, lakes, etc., as needed and desired.

The modified resins of this invention may be combined over wide limits with cellulose derivatives to give lacquers having valuable properties. The following is an example of an unmodified resin combined with nitrocellulose in a lacquer:

Example IV

| | |
|---|---|
| Resin of Example I | 5.00 |
| Nitrocellulose (0.50 secs.) | 5.00 |
| Alcohol | 3.87 |
| Cellosolve acetate | 1.29 |
| Ethyl acetate | 6.93 |
| Butyl acetate | 51.29 |
| Aliphatic hydrocarbon solvent mixture | 4.72 |
| Toluol | 5.00 |
| | 83.10 |

Films cast from the above lacquer are hard, and have very good water- and oil-resistance.

The oil modified resins, as shown by the following example, may be used per se as coating compositions for wood and steel.

Example V

| | |
|---|---|
| Resin of Example III | 50 |
| Hi-flash naphtha | 119 |
| | 169 |

To the above resin solution was added a sufficient amount of cobalt linoleate drier solution to give 0.01% cobalt based on the weight of the oil contained in the resin. The varnish thus obtained was sprayed over stained and filled mahogany and over primed and unprimed steel. After six months' exposure the films are still in good condition.

Polycarboxylic acids are useful generally in making the resins of this invention. Among other suitable polycarboxylic acids are fumaric, maleic, tartaric, substituted phthalic acids, citric, thio-dilactylic, salicyl-acetic, diphenic, naphthalic, pyromellitic, succinic, aminosuccinic, etc.

Suitable modifying agents, in addition to linseed oil acids, are other fatty oil acids and preheated fatty oil-polyhydric alcohol mixtures, e. g. linseed oil mono- and di-glycerides; rosin and other natural resins and resin acids; monohydric alcohols, e. g. amyl, butyl, myricyl, octadecyl, and benzyl alcohols; polyhydric alcohols, e. g. glycerol and polyglycerols; ethylene glycol, propylene glycol, hexamethylene glycol, and the like; polyglycols, e. g. diethylene glycol; pentaerythritol; triethanolamine, diethanolamine, and the like; amino acids, e. g. glycine, etc.

Changes in the procedure for carrying out the resin-making process such as the pre-heating of the resins under a water cooled reflux condenser, or their preparation in an atmosphere of inert gas, e. g. nitrogen or carbon dioxide, will readily occur to those skilled in the art. Similarly, variations in the order of addition or reacting the ingredients may be made. The resins of the present invention may also be made by heating the ingredients in an inert solvent, provision being made for the separation of the water of reaction.

Our new resins are useful in lacquers, enamels, baked or air dried, and varnishes for wood or metal. They are also useful as insulating varnishes; molding compositions; impregnating agents for wood, paper, or cloth, etc.; binders, cements and adhesives; adhesives for pyralin and cellulose acetate for use in laminated products, e. g. safety glass, etc., and as the whole interlayer in safety glass.

The use of solid glycols in lieu of the glycols of the prior art is a decided advantage in the present process because the resins can be made by simply heating the ingredients together in an open vessel, whereas in the case of resins made from the liquid glycols of the prior art, the use of closed vessels fitted with suitable condensing equipment is necessary to prevent loss of the glycol by vaporization. The use of a condenser is undesirable because it inhibits the free removal of water from the reaction mixture, and thus retards the reaction of esterification.

An important advantage of the resins of this invention which makes them unique among the polyhydric alcohol-polycarboxylic acid resins is their solubility in aliphatic hydrocarbons as contrasted with the resins of the prior art which require modification with various materials, e. g. oils, oil acids, natural resins and resin acids, etc., to make them soluble in aliphatic hydrocarbons.

As many apparently widely different embodiments of this invention may be made without departing from the spirit and scope thereof, it is to be understood that I do not limit myself to the specific embodiments thereof except as defined in the following claims.

We claim:

1. The resinous reaction product of polycarboxylic acid and an alkyl disubstituted glycol of the general formula R.CHOH.CHOH.R, where R is a straight aliphatic carbon chain of at least nine carbon atoms.

2. The aliphatic hydrocarbon soluble resinous condensation product of a polycarboxylic acid and an alkyl disubstituted ethylene glycol of the general formula R.CHOH.CHOH.R, where R is a straight aliphatic carbon chain of at least nine carbon atoms.

3. A process for making resins which comprises heat treating a mixture of polycarboxylic acid and an alkyl disubstituted glycol of the general formula R.CHOH.CHOH.R, where R is a straight aliphatic carbon chain of at least nine carbon atoms.

4. The resinous reaction product of polycarboxylic acid and symmetrical diundecyl ethylene glycol.

5. A process for making resins which comprises heat treating a mixture of polycarboxylic acid and symmetrical diundecyl ethylene glycol.

VIRGIL L. HANSLEY.
NORMAN D. SCOTT.